United States Patent
Yang et al.

(10) Patent No.: US 11,570,826 B2
(45) Date of Patent: Jan. 31, 2023

(54) METHOD AND DEVICE FOR ESTABLISHING SESSION

(71) Applicant: GUANGDONG OPPO MOBILE TELECOMMUNICATIONS CORP., LTD., Dongguan (CN)

(72) Inventors: Haorui Yang, Dongguan (CN); Jianhua Liu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 121 days.

(21) Appl. No.: 17/163,165

(22) Filed: Jan. 29, 2021

(65) Prior Publication Data
US 2021/0160936 A1 May 27, 2021

Related U.S. Application Data

(63) Continuation of application No. PCT/CN2019/100280, filed on Aug. 12, 2019.

(51) Int. Cl.
*H04W 76/10* (2018.01)
(52) U.S. Cl.
CPC .................. *H04W 76/10* (2018.02)
(58) Field of Classification Search
CPC ..... H04W 76/12; H04W 76/10; H04W 76/11; H04W 76/27; H04W 80/10;
(Continued)

(56) References Cited

U.S. PATENT DOCUMENTS 10,812,629 B2 * 10/2020 Park .................. H04L 69/04
10,938,583 B2 * 3/2021 Qiao .................. H04W 4/24
(Continued)

FOREIGN PATENT DOCUMENTS

CA 3026841 A1 * 6/2019 ............ H04W 24/02
CA 3045804 A1 * 11/2019 ............ H04L 1/189
(Continued)

OTHER PUBLICATIONS

ETSI TS 124 501 V15.0.0 5G; Non-Access-Stratum (NAS) protocol for 5G System (5GS); Stage 3 (3GPP TS 24.501 version 15.0.0 Release 15), dated Jul. 2018 (Year: 2018).*
(Continued)

*Primary Examiner* — Mahendra R Patel
(74) *Attorney, Agent, or Firm* — Bayes PLLC

(57) ABSTRACT

The present disclosure provides a method for establishing a session, which is applied to a terminal device and includes sending a session establishment request to a network device. The session establishment request is used to request to establish a first session. The session establishment request includes first indication information. The first indication information indicates that the first session is a deactivated session or an activated session. The method also includes receiving a response message of the session establishment request from the network device. If the number of DRBs has reached a number threshold, the terminal device can request the network device to establish a deactivated first session via the first indication information. When the number of DRBs is less than the number threshold, the terminal device or the network device can activate the first session.

20 Claims, 3 Drawing Sheets

Network device 110

Terminal device 120

(58) Field of Classification Search
CPC ............. H04W 28/0268; H04W 76/18; H04W 36/0011; H04W 36/0022; H04W 76/30; H04W 24/02; H04W 72/10; H04W 76/34; H04W 76/19; H04W 76/22; H04W 68/02; H04W 12/033; H04W 76/25; H04W 76/32; H04W 28/02; H04W 4/90; H04W 40/248; H04W 28/12; H04W 48/06; H04W 28/06; H04W 8/183; H04W 4/50; H04W 28/08; H04W 76/50; H04W 72/04; H04W 72/0453; H04W 76/00; H04W 80/08; H04W 28/10; H04W 72/1247; H04W 72/1236; H04W 72/1278; H04W 4/10; H04W 76/15
USPC ........................................................ 370/328
See application file for complete search history.

(56) References Cited

U.S. PATENT DOCUMENTS

| | | | | |
|---|---|---|---|---|
| 11,297,551 | B2* | 4/2022 | Ramle | H04W 80/10 |
| 2006/0153124 | A1* | 7/2006 | Kant | H04W 76/10 |
| | | | | 370/328 |
| 2016/0142933 | A1* | 5/2016 | Rastogi | H04W 28/0257 |
| | | | | 370/230 |
| 2016/0366567 | A1* | 12/2016 | Lee | H04W 4/10 |
| 2018/0199398 | A1* | 7/2018 | Dao | H04W 76/27 |
| 2018/0270782 | A1* | 9/2018 | Park | H04W 60/06 |
| 2019/0363843 | A1* | 11/2019 | Gordaychik | H04W 52/58 |
| 2020/0008266 | A1* | 1/2020 | Pan | H04W 28/06 |
| 2021/0211960 | A1* | 7/2021 | Ryu | H04W 76/12 |
| 2021/0227422 | A1* | 7/2021 | Sharma | H04W 80/02 |

FOREIGN PATENT DOCUMENTS

| | | | | |
|---|---|---|---|---|
| CN | 101563950 | A | 10/2009 | |
| CN | 102904914 | A | 1/2013 | |
| CN | 107736040 | A | 2/2018 | |
| CN | 109963351 | A | 7/2019 | |
| CN | 110062328 | A | 7/2019 | |
| EP | 3583824 | B1 * | 5/2021 | ............ H04W 60/06 |
| GB | 2581392 | A * | 8/2020 | ............ H04W 12/10 |
| WO | 2017189043 | A1 | 11/2017 | |
| WO | WO-2018066799 | A1 * | 4/2018 | ............ H04L 47/19 |
| WO | 2018154356 | A1 | 8/2018 | |
| WO | WO-2019020117 | A1 * | 1/2019 | ............ H04W 36/00 |
| WO | WO-2019160788 | A1 * | 8/2019 | ............ H04W 72/10 |
| WO | WO-2020249201 | A1 * | 12/2020 | ............... H04L 1/08 |
| WO | WO-2020256742 | A1 * | 12/2020 | ............ H04W 76/10 |

OTHER PUBLICATIONS

First Office Action issued in corresponding Indian Application No. 202127004467, dated Mar. 25, 2022, 6 pages.
Extended European Search Report issued in corresponding European Application No. 19940164.7, dated Jul. 16, 2021, 9 pages.
"Session management per PDU session", Agenda Item: 6.10.4, Source: NEC, SA WG2 Meeting #116bis, S2-164953, Aug. 29-Sep. 3, 2016, China, Sanya, 5 pages.
"3rd Generation Partnership Project; Technical Specification Group Radio Access Network; Evolved Universal Terrestrial Radio Access {E-UTRA); User Equipment (UE) radio access capabilities (Release 13)", 3G pp. TS 36.306 V13.10.0 (Dec. 2018), 66 pages.
PCT Written Opinion of The International Searching Authority issued in corresponding International Application No. PCT/CN2019/100280, dated May 15, 2020, 8 pages.
International Search Report issued in corresponding International Application No. PCT/CN2019/100280, dated May 15, 2020, 8 pages.
"Multiple DRB capability handling", Source to WG: Intel, Huawei, HiSilicon, 3GPP TSG-CT WG1 Meeting #99, C1-163640, Tenerife (Spain), Jul. 25-29, 2016, 13 pages.
First Office Action issued in corresponding Chinese Application No. 202110115453.9, dated Jul. 27, 2022.

* cited by examiner

400
Determine a processing manner of a second session based on a priority of a first session and/or the number of data channels, where the second session is an activated session, and the first session, the second session, and the data channel correspond to the same terminal device — S410
FIG. 4
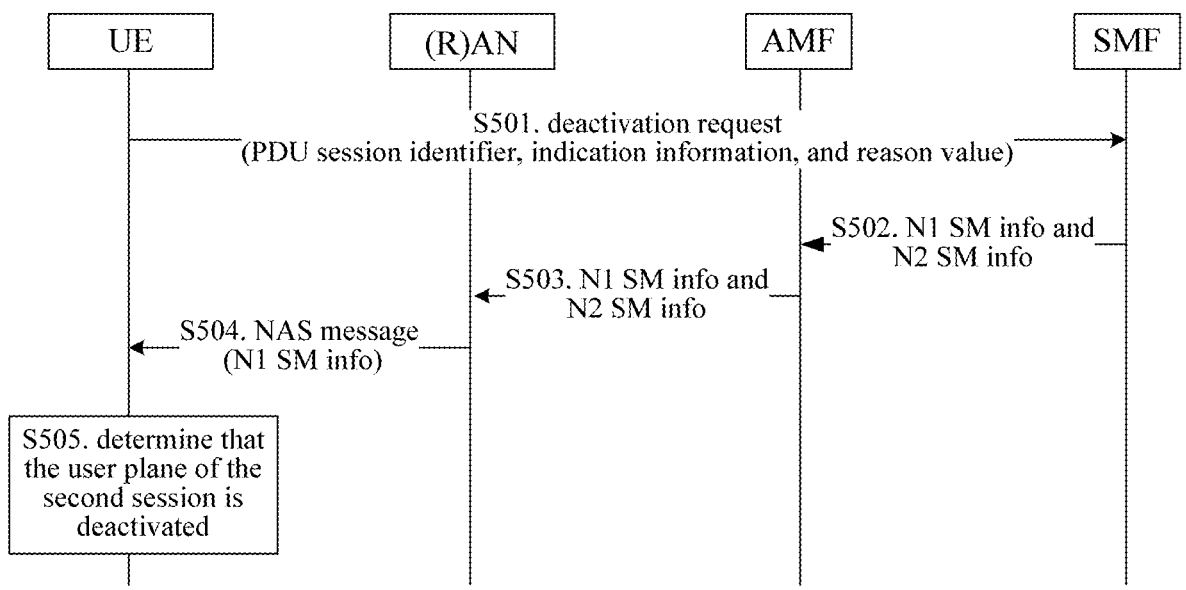
FIG. 5
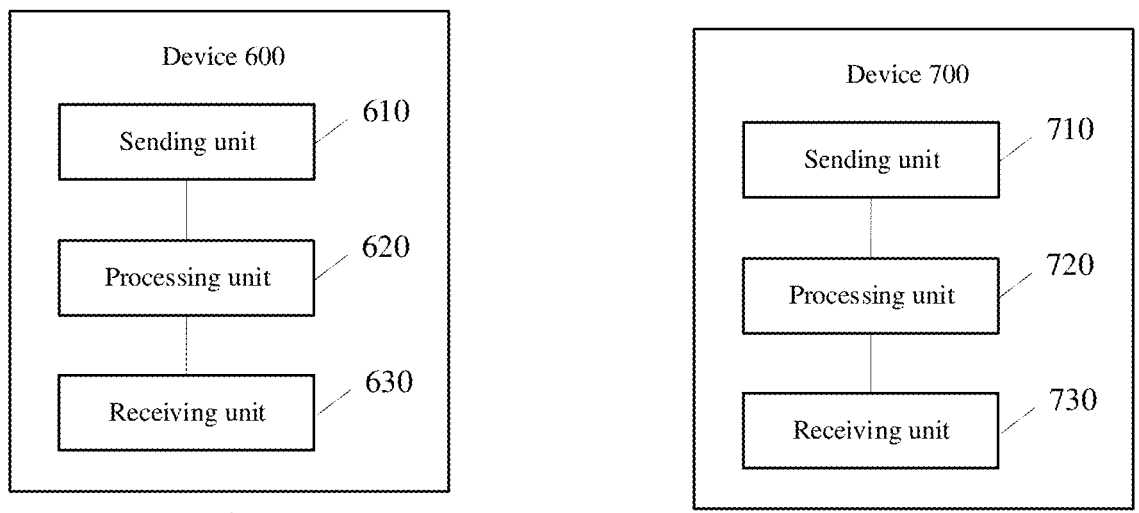
FIG. 6
FIG. 7

METHOD AND DEVICE FOR ESTABLISHING SESSION

CROSS-REFERENCE TO RELATED APPLICATION

This application is a continuation application of International Application No. PCT/CN2019/100280, filed Aug. 12, 2019, the entire contents of which are incorporated herein by reference.

BACKGROUND

The present disclosure relates to the field of communications, and in particular to a method and device for establishing a session.

The 5th generation (5G) mobile communication system supports a protocol data unit (PDU) connection service. The PDU connection service is a service of transmitting PDU data packets between a terminal device and a data network. A data channel for transmitting the PDU data packets can be called a PDU session, which is also called a session for short.

In some scenarios, only a limited number of data radio bearers (DRB) can be used by the terminal device. For example, when the terminal device is accessed to a narrow band internet of things (NB-IoT), usually only two DRBs can be used simultaneously, and each DRB corresponds to one activated session. That is, the terminal device can usually use only two activated sessions simultaneously. If more than 2 activated sessions are used by the terminal device, a negative impact may be applied on communications of other NB-IoT devices. Therefore, how to prevent the number of activated sessions of the terminal device from exceeding a prescribed number is a problem that needs to be solved currently.

SUMMARY

The present disclosure provides a method and device for establishing a session.

In a first aspect, there is provided a method for establishing a session, applied to a terminal device, including sending a session establishment request to a network device, where the session establishment request is used to request to establish a first session, the session establishment request contains first indication information, and the first indication information indicates that the first session is a deactivated session or an activated session; and receiving a response message of the session establishment request from the network device.

If the number of currently activated sessions of the terminal device has not reached a number threshold, the terminal device can request the network device to establish an activated first session via the first indication information; if the number of currently activated sessions of the terminal device has reached the number threshold, the terminal device can request the network device to establish a deactivated first session via the first indication information, and when the number of currently activated sessions of the terminal device is less than the number threshold, the terminal device or the network device can activate the first session. Compared with a scheme in which the first session is newly established after the number of currently activated sessions is less than the number threshold, a scheme in which the deactivated session is first established and then the session is activated can quickly establish the activated session and reduce data transmission delay.

In a second aspect, there is provided a method for establishing a session, applied to a core network device, including receiving a session establishment request from a terminal device, where the session establishment request is used to request to establish a first session, the session establishment request includes first indication information, and the first indication information indicates that the first session is a deactivated session or an activated session; and sending a response message of the session establishment request to the terminal device.

If the session establishment request does not contain the first indication information, the network device cannot determine the type of the first session and may refuse to establish the first session based on constraint conditions (for example, the number of currently activated sessions must not exceed the number threshold). Therefore, the session establishment request containing the first indication information can prevent the network device from misjudging an intention of the terminal device to establish the session in advance without breaking the constraint conditions.

In a third aspect, there is provided a method for processing a session, including determining a processing manner of a second session based on a priority of a first session and/or the number of data channels, where the second session is an activated session, and the first session, the second session, and the data channels correspond to a same terminal device.

The processing manner of the second session may be deactivation, release, or non-deactivation, or non-release. After an execution device of the foregoing method determines the processing manner of the second session, it may determine a processing method for the first session based on a processing result of the second session, where the first session is a session to be activated or to be established. For example, the terminal device may determine whether to establish the first session or whether to activate the first session. Therefore, the above method can coordinate relationships between individual sessions on the terminal device to avoid or reduce a negative impact of a newly established session or a newly activated session on the currently activated session.

In a fourth aspect, there is provided a communication device configured to implement the method of the first aspect and/or the third aspect. Specifically, the device includes functional modules configured to execute the method in the first aspect and/or the third aspect.

In a fifth aspect, there is provided a communication device, configured to implement the method of the second aspect and/or the third aspect. Specifically, the device includes functional modules configured to execute the method in the second aspect and/or the third aspect.

In a sixth aspect, there is provided a terminal device, including a processor and a memory. The memory is configured to store a computer program, and the processor is configured to call and run the computer program stored in the memory to execute the method in the first aspect and/or the third aspect.

In a seventh aspect, there is provided a network device, including a processor and a memory. The memory is configured to store a computer program, and the processor is configured to call and run the computer program stored in the memory to execute the method in the second aspect and/or the third aspect.

In an eighth aspect, there is provided a chip, configured to execute the method in the first aspect and/or the third aspect. Specifically, the chip includes a processor, configured to call and run a computer program from a memory to cause a device installed with the chip to be configured to execute the method in the first aspect and/or the third aspect.

In a ninth aspect, there is provided a chip, configured to execute the method in the second aspect and/or the third aspect. Specifically, the chip includes a processor, configured to call and run a computer program from a memory to cause a device installed with the chip to be configured to execute the method in the second aspect and/or the third aspect.

In a tenth aspect, there is provided a computer-readable storage medium for storing a computer program that causes a computer to execute the method in the first aspect and/or the third aspect.

In an eleventh aspect, there is provided a computer-readable storage medium for storing a computer program that causes a computer to execute the method in the second aspect and/or the third aspect.

In a twelfth aspect, there is provided a computer program product, including computer program instructions that cause a computer to execute the method in the first aspect and/or the third aspect.

In a thirteenth aspect, there is provided a computer program product, including computer program instructions that cause a computer to execute the method in the second aspect and/or the third aspect.

In a fourteenth aspect, there is provided a computer program, which, when running on a computer, causes a computer to execute the method in the first aspect and/or the third aspect.

In a fifteenth aspect, there is provided a computer program, which, when running on a computer, causes a computer to execute the method in the second aspect and/or the third aspect.

BRIEF DESCRIPTION OF THE DRAWINGS

FIG. 4 is a schematic diagram of a method for processing a session provided by the present disclosure;

FIG. 5 is a schematic diagram of another method for processing a session provided by the present disclosure;

FIG. 6 is a schematic diagram of a communication device provided by the present disclosure;

FIG. 7 is a schematic diagram of another communication device provided by the present disclosure;

DETAILED DESCRIPTION

The technical solutions in the embodiments of the present disclosure will be described below with reference to the accompanying drawings in the embodiments of the present disclosure. Obviously, only a part of the embodiments, not all the embodiments of the present disclosure, are described. All other embodiments obtained, based on the embodiments described in the present disclosure, by those skilled in the art without paying creative efforts shall fall within the protection scope of the present disclosure.

Figure 1:
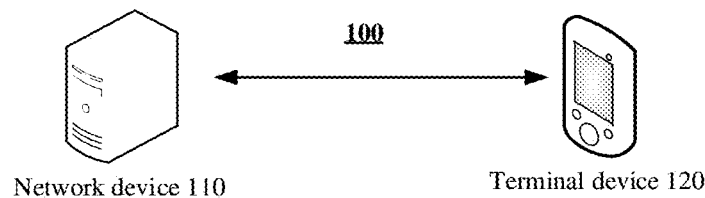
FIG. 1 is a schematic diagram of a communication system to which the present disclosure is applied.

First, an application scenario of the present disclosure is introduced. FIG. 1 is a schematic diagram of a communication system to which the present disclosure is applied.

A communication system 100 includes a network device 110 and a terminal device 120. The terminal device 120 can communicate with the network device 110. For example, the terminal device 120 may communicate with the network device 110 through radio waves, and may also communicate with the network device 110 through optical fibers or cables.

In the present disclosure, the terminal device 120 may include various devices having wireless communication functions, such as handheld devices, vehicle-mounted devices, wearable devices, computing devices, or other processing devices connected to a wireless modem. For example, the terminal device 120 may be user equipment (UE), mobile stations (MS), soft terminals, home gateways, set-top boxes, etc., defined by the third generation partnership project (3GPP).

The network device 110 may be an access network device and/or a core network device complying with 3GPP specifications, for example, a base station (gNB) and/or a core network device in a 5G mobile communication system. The network device 110 may also be a non-3GPP network device, such as an access gateway (AGF). The network device 110 may also be a relay station, an access point, a vehicle-mounted device, a wearable device, and other types of devices.

The communication system 100 is only an example, and communication systems applicable to the present disclosure are not limited to this.

The terminal device 120 can transmit data through different access technologies. For example, the terminal device 120 may communicate with the 3GPP core network (such as the network device 110 in FIG. 1) through the 3GPP access network, and the terminal device 120 may also communicate with the 3GPP core network through the non-3GPP interworking function (N3IWF). A method for establishing a session provided by the present disclosure will be described in detail below.

Figure 2:
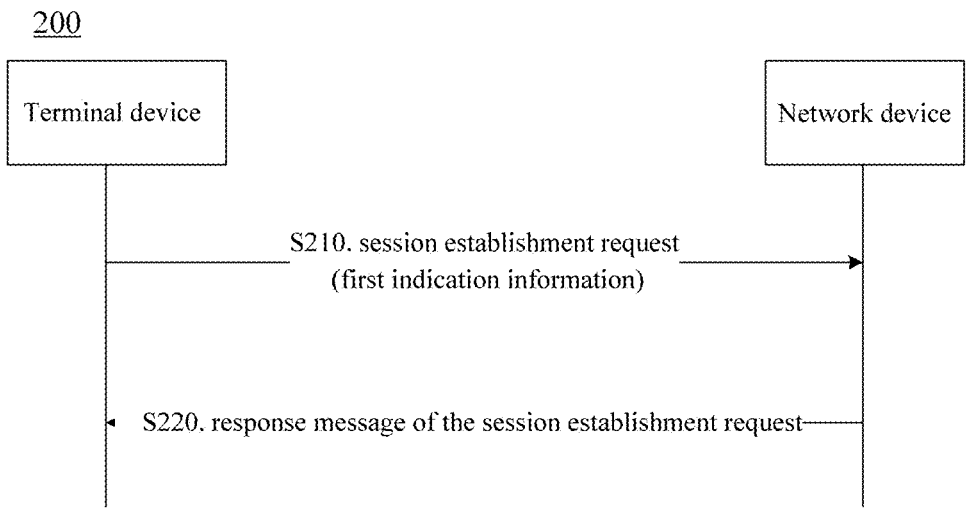
FIG. 2 is a schematic diagram of a method for establishing a session provided by the present disclosure.

FIG. 2 is a schematic diagram of a method for establishing a session provided by the present disclosure. The method 200 includes the steps described below.

In S210, a session establishment request is sent to a network device.

When a terminal device needs to establish a first session, the terminal device may send a session establishment request to the network device. The session establishment request is used to request to establish the first session. The session establishment request contains first indication information. The first indication information indicates that the first session is a deactivated session or an activated session. In the present disclosure, words such as "first" and "second" are used for denoting different individuals. For example, "first session" and "second session" refer to two different sessions. Except this, there are no other limitations.

The deactivated session can be interpreted as a session lacking user plane resources; correspondingly, the activated session can be interpreted as a session including the user plane resources.

The user plane resources are, for example, data bearers (i.e., DRB) of Uu interfaces and N3 tunnels. When there is no data transmission in a session for a period of time, or when resources of the network device (or terminal device) are insufficient, the network device or terminal device can trigger a deactivation process to deactivate the session.

Context of the deactivated session is still stored in the terminal device and the core network device. For example, a session identifier, an Internet protocol (IP) address, and a quality of service (QoS) rule and so on are still stored in the terminal device and the core network device. However, the context related to the deactivated session in the (radio) access network ((R)AN) is deleted.

When there is uplink data or downlink data to be transmitted, the terminal device or the core network device can activate the user plane resources of the deactivated session by a service request process, so that the deactivated session becomes the activated session, and the uplink data or the downlink data is transmitted by the activated session. A process of activating the deactivated session by the terminal device or the core network device through the service request process can refer to the related art, and for the sake of brevity, details are not described here.

The network device in the method 200 is, for example, a session management function (SMF). The terminal device may send the session establishment request to the SMF via the (R)AN, or send the session establishment request to the SMF via an access and mobility management function (AMF), or may also send the session establishment request to the SMF via the (R)AN and AMF. Correspondingly, the SMF can receive the session establishment request from the terminal device via the (R)AN, or receive the session establishment request from the terminal device via the AMF, or may also receive the session establishment request from the terminal device via the (R)AN and AMF. The present disclosure does not limit the manner in which the session establishment request is transmitted between the terminal device and the network device.

Since the session establishment request includes the first indication information, the terminal device can indicate the type of the first session to the network device, that is, whether the first session is the activated session or the deactivated session.

For example, if the number of currently activated sessions of the terminal device has not reached a number threshold, the terminal device can request the network device to establish an activated first session via the first indication information; if the number of currently activated sessions of the terminal device has reached the number threshold, the terminal device can request the network device to establish a deactivated first session via the first indication information, and the terminal device or the network device can activate the first session when the number of currently activated sessions of the terminal device is less than the number threshold. Compared with a scheme in which the first session is newly established after the number of currently activated sessions is less than the number threshold, a scheme in which the deactivated session is first established and then the session is activated can quickly establish the activated session and reduce data transmission delay.

For another example, if the number of DRBs of the terminal device has not reached the number threshold, the terminal device can request the network device to establish an activated first session via the first indication information; if the number of DRBs of the terminal device has reached the number threshold, the terminal device can request the network device to establish a deactivated first session via the first indication information, and the terminal device or the network device can activate the first session when the number of DRBs is less than the number threshold. Compared with a scheme in which the first session is newly established after the number of DRBs is less than the number threshold, a scheme in which the deactivated session is first established and then the session is activated can quickly establish the activated session and reduce data transmission delay.

The aforementioned "the number of currently activated sessions" can be interpreted as the number of activated sessions existing on the terminal device at the moment when the terminal device runs a program to determine whether the number of activated sessions reaches the number threshold. In the present disclosure, when the terminal device or the network device executes the "determining step," the "determining condition" refers to a condition at the moment when the "determining step" is executed. For example, for the following determining step: when the number of DRBs of the terminal device is less than the number threshold, it is determined that the first session is the activated session; "the number of DRBs of the terminal device is less than the number threshold" is the determining condition, and the DRB in the determining condition refers to the DRB that exists on the terminal device when this determining step is performed. In addition, unless otherwise specified, the DRBs in the present disclosure are all activated DRBs.

For the network device, if the session establishment request does not include the first indication information, the network device cannot determine the type of the first session and may refuse to establish the first session based on constraint conditions (for example, the number of currently activated sessions should not exceed the number threshold). Therefore, the session establishment request containing the first indication information can prevent the network device from misjudging an intention of the terminal device to establish the session in advance without breaking the constraint conditions.

The first indication information may be one bit in the session establishment request. For example, when the value of the bit is "0", the first indication information indicates that the first session is an activated session; when the value of the bit is "1", it indicates that the first session is a deactivated session. The present disclosure does not limit the specific form of the first indication information.

The terminal device may determine the type of the first session before sending the session establishment request, that is, determine whether the first session is the activated session or the deactivated session.

For example, when the number of currently activated sessions of the terminal device is less than the number threshold, the first session is determined to be the activated session; or, when the number of currently activated sessions of the terminal device is equal to the number threshold, the first session is determined to be the deactivated session.

For another example, when the number of DRBs of the terminal device is less than the number threshold, the first session is determined to be the activated session; or, when the number of DRBs of the terminal device is equal to the number threshold, the first session is determined to be the deactivated session.

In the NB-IoT, there is a one-to-one correspondence between sessions and DRBs. Therefore, the number of currently activated sessions is equivalent to the number of DRBs. The above-mentioned number threshold is, for example, 2. The type of the first session is determined based on the number of currently activated sessions or the number of DRBs so that the number of currently activated sessions (or the number of DRBs) is prevented from exceeding the number threshold specified by the network device or the communication protocol.

In addition to determining the type of the first session based on the number of currently activated sessions, the terminal device may also determine the type of the first session based on a priority of the first session. The priority of the session may be a priority of a service that uses the session or a priority of the session derived from the priority of the service.

For example, when the priority of the first session is higher than or equal to a target priority, the first session is determined to be an activated session; or, when the priority of the first session is lower than the target priority, the first session is determined to be a deactivated session.

The target priority may be a priority configured by the network device, or may also be a priority determined by the terminal device (for example, a priority set by the user of the terminal device), or may also be a priority defined by the communication protocol.

For example, the target priority is a security alert level. If the first session is a session of service data, the priority of the first session is a normal service level which is lower than the security alert level, and the terminal device can determine that the first session is the deactivated session; if the first session is a session of security alert data, the priority of the first session is the security alert level, and the terminal device can determine that the first session is the activated session (in this case, the terminal device can ignore the limit of the number threshold).

Optionally, the terminal device may also determine the type of the first session based on the number threshold and the priority of the first session.

For example, the number threshold is 2. If the number of DRBs is 0, the terminal device can determine that the first session is the activated session when the priority of the first session is lower than or equal to or higher than the target priority; if the number of DRBs is 1, the terminal device can determine that the first session is the activated session when the priority of the first session is equal to or higher than the target priority, and the terminal device may determine that the first session is the deactivation session when the priority of the first session is lower than the target priority. If the number of DRBs is 2, the terminal device may determine that the first session is the activated session when the priority of the first session is higher than the target priority, and the terminal device may determine that the first session is the deactivation session when the priority of the first session is lower than or equal to the target priority.

In the above examples, the terminal device is enabled to obtain flexible services under different resource usage rates, and the communication quality is improved on the premise of meeting basic communication requirements.

The method for the network device to determine the type of the first session is similar to the method for the terminal device to determine the type of the first session described above. The network device may also determine the type of the first session based on the number of currently activated sessions and/or the priority of the first session.

The determining condition of the network device may be different from that of the terminal device. For example, when the priority of the first session is equal to the target priority, the terminal device determines that the first session is the activated session and indicates that the first session is the activated session by the first indication information. However, the network device can determine the first session is the deactivation session in this case.

After determining the type of the first session, the network device may send a response message of the session establishment request of the first session to the terminal device. Correspondingly, the terminal device can perform the following steps.

In S220, a response message of the session establishment request is received from the network device.

The response message may contain information indicating that the first session is the activated session and may also contain information indicating that the first session is the deactivated session.

For example, the first indication information indicates that the first session is the deactivated session. If the above response message contains an acknowledgement (ACK), it means that the first session is successfully established, and the first session is the deactivated session; if the above response message contains a non-acknowledgement (NACK), it means that the establishment of the first session fails.

For another example, the first indication information indicates that the first session is the activated session. If the above response message contains the ACK, it means that the first session is successfully established, and the first session is the activated session; if the above response message contains the NACK, it means that the first session is successfully established, but the first session is the deactivated session.

For another example, the first indication information indicates that the first session is the activated session. If the above response message contains the ACK, it means that the first session is successfully established, and the first session is the activated session; if the above response message contains the NACK, it means that the establishment of the first session fails.

When the response message indicates that the first session is successfully established, and the first session is the deactivated session, the method 200 further includes:

activating the first session when the first session meets a target condition.

The target condition can be preset or dynamically indicated by the network device. The process of activating the first session may be triggered by the terminal device or the network device.

The target condition may be met by the first session when the number of currently activated sessions is less than the number threshold. For example, if some applications of the terminal device have no data transmission for a long time, the terminal device will deactivate or release part of the currently activated sessions, so that the number of currently activated sessions is less than the number threshold.

The target condition may also be met by the first session when the priority of the first session is higher than or equal to the target priority. For example, the data is not transmitted for a long time because the first session is still not activated after a long period of time, the terminal device can improve the priority of the first session so that the priority of the first session is higher than or equal to the target priority.

Optionally, if the response message indicates that the establishment of the first session fails, or, if the first indication information indicates that the first session is the activated session and the response message indicates that the first session is the deactivated session, the method 200 may further include the following step:

determining, by the terminal device, not to establish and/or activate the session in a first time period, according to the response message.

The first time period can be a preset time period or a time period indicated in the response message. The terminal device may start a timer after receiving the response message, set the running time of the timer as the first time period, and do not initiate the session establishment process during the running of the timer.

In the method 200, if the network device determines that the first session is the deactivated session, the network device may determine not to send a session message (for example, N2 SM Info) for establishing the DRB of the first session to the (R)AN to avoid (R)AN establishing the DRB of the first session. Alternatively, the network device may send the session message to the (R)AN, and the session message contains part of the information required by the (R)AN to establish the DRB, so as to prevent the (R)AN from establishing the DRB of the first session.

For example, SMF sends N2 SM Info to (R)AN via AMF, N2 SM Info includes the session identifier of the first session, (R)AN cannot establish DRB based on the session identifier of the first session only. Therefore, after the (R)AN receives the N2 SM Info, a deactivated first session is established. That is, the (R)AN only saves the context of the first session, but does not configure or establish the DRB for the first session. Optionally, the N2 SM Info may further include a piece of second indication information, which indicates the (R)AN to establish a deactivated first session or indicates the (R)AN that the DRB of the first session is prohibited from being established.

Figure 3:
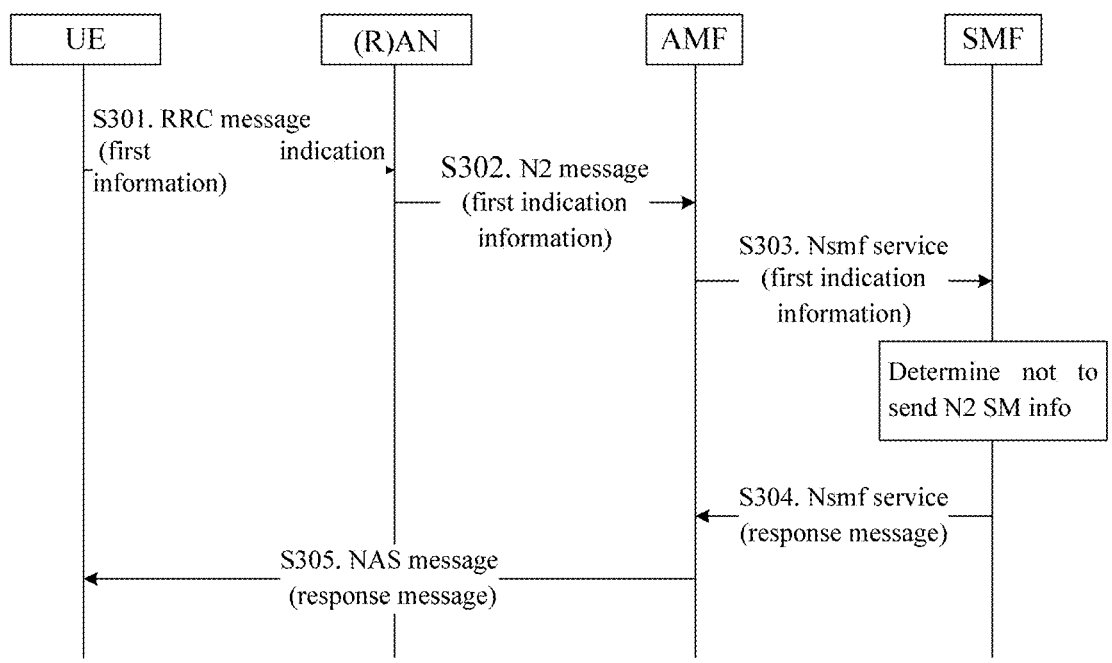
FIG. 3 is a schematic diagram of another method for establishing a session provided by the present disclosure.

The process of establishing the first session between the terminal device and the network device is shown in FIG. 3. The process includes the steps described below.

In S301, the UE sends a radio resource control (RRC) message to the (R)AN. The RRC message includes a non-access stratum (NAS) message, and the NAS message includes a PDU session identifier, single-network slice selection assistance information (S-NSSAI), a data network name (DNN), and a PDU session establishment request. The PDU session establishment request is used to request to establish the first session, and the PDU session establishment request includes the first indication information. If the UE has currently established 2 activated sessions (or 2 DRBs), the first indication information indicates that the first session is the deactivated session.

In S302, the (R)AN forwards the received NAS message to the AMF via the N2 message.

In S303, the AMF selects SMF according to the information such as DNN and S-NSSAI and forwards the UE identifier, the PDU session identifier, DNN, S-NSSAI, and the PDU session establishment request to the SMF by calling the Nsmf service.

In S304, after receiving the first indication information, the SMF does not send the N2 SM info to the (R)AN if it is determined that the first session is the deactivated session. In this way, the (R)AN will not establish the DRB for the first session. Alternatively, the SMF may send the N2 SM info (including a user plane function (UPF) tunnel identifier) to the (R)AN, and the SMF may also send the second indication information to the (R)AN to indicate the first session is the deactivated session. After receiving the second indication information, the (R)AN only saves the context of the first session, but does not configure or establish the DRB for the first session. The SMF can send the UPF tunnel identifier to the AMF by calling the Namf service.

In S305, the AMF sends the response message to the UE via the (R)AN. The response message is, for example, a PDU session establishment accept. The PDU session establishment accept may include a confirmation indication indicating that the first session has been established. The PDU session establishment accept can be carried in a downlink NAS message.

After receiving the response message, the UE determines that the first session is successfully established, and the first session is not activated. When one of the currently activated sessions is deactivated or released, the UE can initiate the service request process to activate the first session to transmit data.

The method for establishing a session provided by the present disclosure is described in detail above, and a method for processing a currently activated session (for example, a second session) provided by the present disclosure will be introduced below.

As shown in FIG. 4, the method 400 includes S410.

In S410, a processing manner of a second session is determined based on the priority of the first session and/or the number of data channels, where the second session is an activated session, and the first session, the second session, and the data channel corresponding to the same terminal device.

The method 400 may be executed by the terminal device or be executed by the network device (for example, SMF or (R)AN). Alternatively, the method 400 may be executed by a chip in the foregoing devices.

When the method 400 is executed by the terminal device, the terminal device can obtain a session message generated by an application layer or a UE route selection policy (URSP) handling layer or an operating system, and the session message requests to establish or activate the first session. The terminal device executes S410 in response to the session message. That is, the session message triggers the terminal device to execute S410.

When the method 400 is executed by the SMF, the SMF may obtain the session message (for example, the session establishment request or the service request of the first session) from the terminal device, and the SMF executes S410 in response to the session message; that is, the session message triggers the SMF to execute S410. The SMF may also obtain the session message from the UPF, and the session message is, for example, a downlink data notification.

When the method 400 is executed by the (R)AN, the (R)AN can obtain the session message sent by the SMF from the AMF. The session message informs the (R)AN to establish the first session, and the (R)AN executes S410 in response to the session message; that is, the session message triggers the (R)AN to perform S410.

The processing manner of the second session may be deactivation, release, or non-deactivation, or non-release. After the processing manner of the second session is determined by an execution device of the method 400, the processing manner of the first session may be determined based on a processing result of the second session, where the first session is a session to be activated or a session to be established. For example, the terminal device may determine whether to establish the first session, or determine whether to activate the first session. Therefore, the method 400 can coordinate relationships between individual sessions on the terminal device to avoid or reduce a negative impact of a newly established session or a newly activated session on the currently activated session.

The data channel may be the currently activated session or DRB. When the data channel is the currently activated session, the processing manner of the second session may be determined by the execution device of method 400 based on the priority of the first session and/or the number of currently activated sessions; when the data channel is DRB, the processing manner of the second session may be determined by the execution device of method 400 based on the priority of the first session and/or the number of DRBs. In the following, a situation where the data channel is the currently activated session is taken as an example for description.

As an optional example, when the number of currently activated sessions is equal to the number threshold, the processing manner of the second session is determined by the execution device based on the priority of the first session; or, when the number of currently activated sessions is less than the number threshold, the execution device does not determine the processing manner of the second session based on the priority of the first session.

If the execution device is the terminal device, when the number of currently activated sessions is less than the number threshold, the terminal device may not initiate a process of releasing or deactivating the second session; when the number of currently activated sessions is equal to the number threshold, the terminal device may determine whether to initiate the process of releasing or deactivating the second session based on the priority of the first session (or the priority of the second session). This example also applies to SMF.

If the execution device is the (R)AN and the (R)AN receives the session message for establishing or activating the first session, the (R)AN may not deactivate or release the second session when the number of currently activated sessions is less than the number threshold; or (R)AN can determine whether to deactivate or release the second session based on the priority of the first session (or the priority of the second session) when the number of currently activated sessions is equal to the number threshold.

In the above example, the number threshold may be 2.

As an optional example, the processing manner of the second session may be determined based on the priority of the first session in the following manner:

when the priority of the first session meets a priority requirement, the execution device deactivates the second session, or the execution device releases the second session; or, when the priority of the first session does not meet the priority requirement, the execution device determines not to deactivate the second session, or the execution device determines not to release the second session.

If the execution device is the terminal device when the priority of the first session does not meet the priority requirement, the terminal device may not initiate the process of releasing or deactivating the second session; when the priority of the first session meets the priority requirement, the terminal device can initiate the process of releasing or deactivating the second session. This example is also applicable to SMF.

For example, the priority of the first session is the normal service level, and the priority requirement is that the priority of a newly established or a newly activated session needs to reach the security alert level, which is higher than the normal service level. In this case, the terminal device or SMF may not initiate the process of releasing or deactivating the second session.

If the execution device is the (R)AN, and the (R)AN receives the session message for establishing or activating the first session, the (R)AN may not deactivate or release the second session and refuse to establish or activate the first session when the priority of the first session does not meet the priority requirement; or the (R)AN can deactivate or release the second session when the priority of the first session meets the priority requirement.

The priority of the first session meets the priority requirement when the priority of the first session is equal to or higher than a priority threshold or when the priority of the first session is equal to or higher than the priority of the second session. Correspondingly, the priority of the first session does not meet the priority requirement when the priority of the first session is lower than the priority threshold or when the priority of the first session is lower than the priority of the second session. The priority threshold may be configured by the network device, may also be determined by the terminal device, or may be specified by the communication protocol.

In the above example, if the terminal device initiates the process of deactivating the second session, the method 400 may include the following step:

sending, by the terminal device, a deactivation request to the network device (for example, SMF) to deactivate the second session.

The second session may include one transmission path or at least two transmission paths. The at least two transmission paths may include a new radio (NR) transmission path and a long term evolution (LTE) transmission path, or the at least two paths may include a 3GPP transmission path and a non-3GPP transmission path. The present disclosure does not limit the at least two transmission paths of the second session.

When the second session includes at least two transmission paths, the deactivation request may include indication information, and the indication information may indicate to deactivate at least one of the at least two paths of the second session.

The indication information in the deactivation request may be one or more bits or other forms of information. The present disclosure does not limit the specific form of the indication information in the deactivation request.

Optionally, the aforementioned deactivation request further includes a reason value indicating a reason for deactivating the second session. The reason for deactivating the second session may be at least one of the following: insufficient resources, resource usage exceeding a resource threshold, and the number of DRBs of the terminal device has reached 2.

The above resources may be processor resources of the terminal device. For example, the processor of the terminal device is heavily burdened and cannot carry 3 or more DRBs (that is, insufficient resources); or the processor usage rate of the terminal device exceeds a usage threshold (that is, the resource usage exceeds the resource threshold), the terminal device can write the above reason in the deactivation request.

After sending the deactivation request to the network device, the terminal device may receive a response message of the deactivation request from the network device. The response message indicates that the second session is deactivated.

Optionally, if the terminal device determines that the establishment of the first session fails, the terminal device may not establish and/or activate the session within the first time period.

The first time period can be a preset time period or a time period indicated in the response message. The terminal device may start a timer after receiving the response message, set the running time of the timer to the first time period, and do not initiate the session establishment process and/or the session activation process during the running of the timer.

Optionally, if the execution device of the method 400 determines to deactivate or release the second session after performing 5410, the terminal device and the network device can establish the activated first session or deactivated first session according to the method 200 or the method shown in FIG. 3. If the execution device of the method 400 determines not to deactivate or release the second session after performing S410, the terminal device and the network device can establish the deactivated first session according to the method 200 or the method shown in FIG. 3.

In the following, another example of processing the currently activated session provided by the present disclosure is given.

The UE has established 2 activated sessions (or 2 DRBs) currently, and the communication system where the UE is located stipulates that each terminal device maintains at most 2 activated sessions (or 2 DRBs) at the same time. An application of UE requests to establish a new session. Then the UE can decide whether to deactivate the currently activated session based on the priority of the service of the application.

For example, if the UE that is transmitting chat data suddenly generates security alarm information required to be transmitted, and the priority of the security alarm information is higher than the priority of the chat data, the UE can deactivate the session for transmitting daily data, and establish or activate a session for the security alarm information.

The process of UE deactivating the session is shown in FIG. 5, and the process includes steps described below.

In S501, the UE sends the deactivation request to the SMF via the (R)AN and AMF. The deactivation request includes the PDU session identifier of the second session, the indication information, and the reason value (optional). The indication information is used for indicating to the SMF to deactivate the second session, the reason value may be insufficient resources, resource usage exceeding the resource threshold, and the number of the DRB of the UE has reached 2, and so on.

In S502, the SMF decides to deactivate the second session. The SMF may send a session message to the AMF. The session message may include N1 SM info (optional) for the UE and N2 SM info for the (R)AN. The N1 SM info contains the response message of the deactivation request in S501, and the N2 SM info contains the user plane release information to notify the (R)AN to release the DRB.

In S503, the AMF forwards the N1 SM info and N2 SM info to the (R)AN.

In S504, the (R) AN releases the DRB of the second session according to the N2 SM info, and sends the N1 SM info to the UE via the RRC message. Optionally, the (R)AN may also determine by itself whether to release the DRB of the second session according to the N2 SM info.

In S505, the UE determines that the user plane of the second session is deactivated according to the N1 SM info or the release of the DRB of the second session.

If the first session has been established, the UE can activate the user plane of the first session via the service request process to transmit the security alert information; if the first session is not established, the UE can establish the first session by the session establishment process to transmit the security alert information.

If the establishment or activation of the first session fails (for example, the priority of the first session does not meet the requirement), the NAS layer of the UE can notify the application layer and the URSP handling layer of the failure to establish or activate the first session, and set a timer. Before the timer ends running, the application cannot initiate the session establishment or activation request.

The above describes in detail the examples of the method for establishing the session and the method for processing the session provided by the present disclosure. It can be understood that, in order to realize the above-mentioned functions, the communication device includes hardware structures and/or software modules corresponding to respective functions. In connection with the units and algorithm steps of each example described the embodiments disclosed herein, those of ordinary skill in the art may realize that the present disclosure can be implemented by hardware or a combination of computer software and hardware. Whether these functions are performed in hardware or software depends on the specific application and design constraints of the technical solution. Professional technicians can use different methods to implement the described functions for each specific application, but such implementation should not be considered to be beyond the scope of the present disclosure.

The present disclosure may divide a communication device into functional units according to the foregoing method examples. For example, respective functions may be divided into respective functional units, or two or more functions may be integrated into one processing unit. The above-mentioned integrated unit can be implemented in the form of hardware or software functional unit. It should be noted that the division of the unit in the present disclosure is illustrative and is only a logical function division. In actual implementation, there may be another division manner.

FIG. 6 is a schematic structural diagram of a communication device provided by the present disclosure. The device 600 includes a processing unit 610, a sending unit 620, and a receiving unit 630. The sending unit 620 is configured to execute a sending step under the control of the processing unit 610, and the receiving unit 630 is configured to execute a receiving step (or an obtaining step) under the control of the processing unit 610.

The sending unit 620 is configured to send a session establishment request to a network device. The session establishment request is used to request to establish a first session and includes first indication information. The first indication information indicates that the first session is a deactivated session or an activated session.

The receiving unit 630 is configured to receive a response message of the session establishment request from the network device.

Optionally, the processing unit 610 is configured to determine whether the first session is the activated session or the deactivated session.

Optionally, the processing unit 610 is specifically configured to: when the number of activated sessions of the terminal device is less than the number threshold, determine that the first session is the activated session; or, when the number of activated sessions of the terminal device is equal to the number threshold, determine that the first session is the deactivated session.

Optionally, the processing unit 610 is specifically configured to when the number of DRBs of the terminal device is less than the number threshold, determine that the first session is the activated session; or, when the number of DRBs of the terminal device is equal to the number threshold, determine the first session is the deactivated session.

Optionally, the number threshold is 2.

Optionally, the processing unit 610 is specifically configured to when a priority of the first session is higher than or equal to a target priority, determine that the first session is the activated session; or, when the priority of the first session is lower than the target priority, determine that the first session is the deactivated session.

Optionally, if the first indication information indicates that the first session is the deactivated session, and the response message indicates that the first session is successfully established, then the processing unit 610 is further configured to: when the first session and/or the DRB of the terminal device meets the target condition, activate the first session.

Optionally, the first session and/or the DRB of the terminal device meets the target condition in the following situation: the number of DRBs of the terminal device is less than the number threshold.

Optionally, the first session and/or the DRB of the terminal device meets the target condition in the following situation: the priority of the first session is higher than or equal to the target priority.

Optionally, when the response message indicates that the establishment of the first session failed, or when the first indication information indicates that the first session is the activated session while the response message indicates that the first session is the deactivated session, the processing unit 610 is further configured to determine, based on the response message, that no session establishment and/or session activation are performed during the first time period.

Optionally, the processing unit 610 is specifically configured to: start a timer based on the response message. The timer is configured to prohibit the session establishment and/or session activation during the first time period.

FIG. 7 is a schematic structural diagram of a communication device provided by the present disclosure. The device 700 includes a processing unit 710, a sending unit 720, and a receiving unit 730. The sending unit 720 is configured to execute a sending step under the control of the processing unit 710, and the receiving unit 730 is configured to execute a receiving step (or an obtaining step) under the control of the processing unit 710.

The receiving unit 730 is configured to: receive a session establishment request from the terminal device. The session establishment request is used to request to establish a first session and includes first indication information. The first indication information indicates that the first session is a deactivated session or an activated session.

The sending unit 720 is configured to send a response message of the session establishment request to the terminal device.

Optionally, when the first indication information indicates that the first session is the deactivated session, the sending unit 720 is further configured to: send a session message to the access network. The session message is used by the access network to establish the first session.

Optionally, the session message includes part of the information required to establish the DRB of the first session.

Optionally, when the first indication information indicates that the first session is the deactivated session, and the sending unit 720 is further configured to determine not to send the session message for establishing the DRB of the first session to the access network.

Optionally, the processing unit 710 is further configured to determine whether the first session is the activated session or the deactivated session.

Optionally, the processing unit 710 is specifically configured to when the number of activated sessions of the terminal device is less than the number threshold, determine that the first session is the activated session; or, when the number of activated sessions of the terminal device is equal to the number threshold, determine that the first session is the deactivated session.

Optionally, the processing unit 710 is specifically configured to when the number of DRBs of the terminal device is less than the number threshold, determine that the first session is the activated session; or, when the number of DRBs of the terminal device is equal to the number threshold, determine the first session is the deactivated session.

Optionally, the number threshold is 2.

Optionally, the processing unit is specifically configured to: when a priority of the first session is higher than or equal to a target priority, determine that the first session is the activated session; or, when the priority of the first session is lower than the target priority, determine that the first session is the deactivated session.

Figure 8:
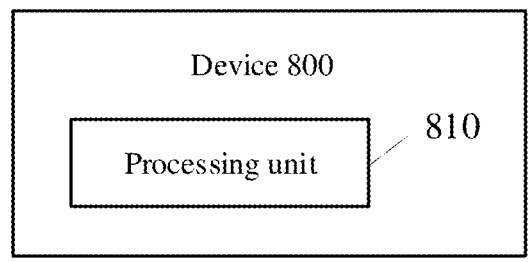
FIG. 8 is a schematic diagram of yet another communication device provided by the present disclosure.

FIG. 8 is a schematic structural diagram of a communication device provided by the present disclosure. The device 800 includes a processing unit 810, and the processing unit 810 is configured to determine a processing manner of a second session based on a priority of a first session and/or the number of data channels, where the second session is an activated session, and the first session, the second session, and the data channel corresponding to the same terminal device.

Optionally, the processing unit 810 is specifically configured to: obtain a session message, which is used for establishing the first session, or for activating the first session; determine the processing manner of the second session based on the priority of the first session and/or the number of data channels.

Optionally, if the data channel is the activated session, the processing unit 810 is specifically configured to when the number of activated sessions is equal to the number threshold, determine the processing manner of the second session based on the priority of the first session; or, when the number of activated sessions is less than the number threshold, decide not to determine the processing manner of the second session based on the priority of the first session.

Optionally, if the data channel is the DRB, the processing unit 810 is specifically configured to when the number of the DRB is equal to the number threshold, determine the processing manner of the second session based on the priority of the first session; Or, when the number of the DRB is less than the number threshold, decide not to determine the processing manner of the second session based on the priority of the first session.

Optionally, the number threshold is 2.

Optionally, the processing unit 810 is specifically configured to: when the priority of the first session meets the priority requirement, deactivate the second session, or release the second session; or, when the priority of the first session does not meet the priority requirement, determine not to deactivate the second session, or determine not to release the second session.

Optionally, when the second session is deactivated, the processing unit 810 is further configured to send a deactivation request to the network device by the sending unit. The deactivation request is used to request to deactivate the second session.

Optionally, the second session includes at least two transmission paths. The deactivation request includes indication information, and the indication information indicates to deactivate at least one transmission path of the at least two transmission paths of the second session.

Optionally, the deactivation request further includes a reason value, and the reason value indicates a reason for deactivating the second session.

Optionally, the reason includes at least one of the following: insufficient resources, resource usage exceeding a resource threshold, and the number of DRBs of the terminal device has reached 2.

Optionally, the processing unit 810 is further configured to: receive a response message of the deactivation request from the network device by the receiving unit, the response message indicating that the second session is deactivated.

Optionally, the processing unit 810 is further configured to determine not to perform session establishment and/or session activation during the first time period according to the failure of the establishment of the first session or the failure of the activation of the first session.

Optionally, the processing unit 810 is specifically configured to: start a timer according to the first session establishment failure or the first session activation failure, and the timer is configured to prohibit session establishment and/or the session activation.

Figure 9:
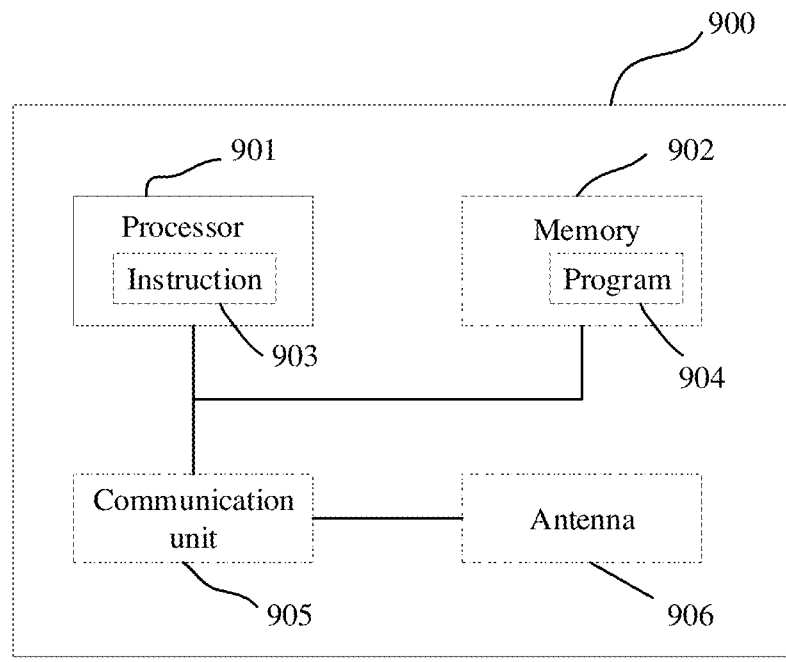
FIG. 9 is a schematic diagram of a communication apparatus provided by the present disclosure.

FIG. 9 shows a schematic structural diagram of a communication apparatus provided by the present disclosure. The dotted line in FIG. 9 indicates that the unit or the module is optional. The apparatus 900 may be configured to implement the methods described in the foregoing method embodiments. The apparatus 900 may be a terminal device or a network device or a chip.

The apparatus 900 includes one or more processors 901, and the one or more processors 901 can support the apparatus 900 to implement the methods in the method embodiments corresponding to FIGS. 2 to 5. The processor 901 may be a general-purpose processor or a special-purpose processor. For example, the processor 901 may be a central processing unit (CPU). The CPU can be configured to control the apparatus 900, execute a software program, and process data of the software program. The apparatus 900 may further include a communication unit 905 to implement signal input (reception) and output (transmission).

For example, the apparatus 900 may be a chip, and the communication unit 905 may be an input and/or output circuit of the chip, or the communication unit 905 may be a communication interface of the chip, and the chip can be used as a component of the terminal device or the network device or other wireless communication devices.

For another example, the apparatus 900 may be a terminal device or a network device, and the communication unit 905 may be a transceiver of the terminal device or the network device, or the communication unit 905 may be a transceiver circuit of the terminal device or the network device.

The apparatus 900 may include one or more memories 902, on which a program 904 is stored. The program 904 can be run by the processor 901 to generate instructions 903, so that the processor 901 executes the methods described in the foregoing method embodiments according to the instructions 903. Optionally, the memory 902 may also store data. Optionally, the processor 901 may also read data stored in the memory 902. The data may be stored at the same storage address as the program 904, or the data may be stored at a different storage address from the program 904.

The processor 901 and the memory 902 may be separately provided or integrated, for example, integrated on a single board of the network device or a system on chip (SOC) of the terminal device.

The apparatus 900 may further include an antenna 906. The communication unit 905 is configured to implement the transceiver function of the apparatus 900 by the antenna 906.

For a specific manner in which the processor 901 executes the communication method, reference may be made to the related description in the method embodiment.

It should be understood that each step of the foregoing method embodiment may be completed by using a logic circuit of hardware in the processor 901 or an instruction in a form of software. The processor 901 may be a CPU, a digital signal processor (DSP), an application specific integrated circuit (ASIC), a Field Programmable Gate Array (FPGA), or other programming logic devices such as discrete gate, transistor logic devices, or discrete hardware components.

The present disclosure also provides a computer program product, which, when executed by the processor 901, implements the method described in any method embodiment in the present disclosure.

The computer program product may be stored in the memory 902, for example, a program 904, which is finally converted into an executable object file that can be executed by the processor 901 after preprocessing, compilation, assembly, and linking.

The present disclosure also provides a computer-readable storage medium on which a computer program is stored, and the computer program, when executed by a computer, implement the method described in any method embodiment in the present disclosure. The computer program can be a high-level language program or an executable target program.

The computer-readable storage medium is, for example, the memory 902. The memory 902 may be a volatile memory or a non-volatile memory, or the memory 902 may include both a volatile memory and a non-volatile memory. The non-volatile memory may be a read-only memory (ROM), a Programmable ROM (PROM), an Erasable PROM (EPROM), an Electrically EPROM (EEPROM) or a flash memory. The volatile memory may be a Random Access Memory (RAM), which is used as an external cache. By way of example, but not limitation, many forms of RAM are available, such as a static random access memory (SRAM), a dynamic random access memory (DRAM), a Synchronous DRAM (SDRAM), a Double Data Rate SDRAM (DDR SDRAM), an Enhanced SDRAM (ES-DRAM), a Synchlink DRAM (SLDRAM) and a Direct Rambus RAM (DR RAM).

Those skilled in the art can clearly understand that, for the convenience and conciseness of the description, the specific working processes and technical effects of the device and equipment described above can refer to the corresponding processes and technical effects in the foregoing method embodiments and are not repeated here.

In the several embodiments provided in the present disclosure, it should be understood that the disclosed systems, devices, and methods may be implemented in other ways. For example, some features of the method embodiments described above can be ignored or not implemented, and the device embodiments described above are only schematic. For example, the division of the unit is only a logical function division. In actual implementation, there may be another division manner. Multiple units or components may be combined or can be integrated into another system. In addition, the coupling between the units or the coupling between the components may be direct coupling or indirect coupling, which may be electrical, mechanical or other forms.

It should be understood that in the various embodiments of the present disclosure, the size of the sequence number of each process does not mean the order of execution. The execution order of each process should be determined by its function and internal logic, and should not constitute any limitation to the implementation process of the embodiments of the present disclosure.

In addition, the terms "system" and "network" herein are often used interchangeably herein. The term "and/or" in this document is only a kind of association relationship describing related objects, which means that there can be three kinds of relationships, for example, A and/or B can mean: A exists alone, A and B exist simultaneously, and B exists alone of these three cases. In addition, the character "/" in this article generally indicates that the related objects are an "or" relationship.

In short, the above descriptions are only preferred embodiments of the technical solutions of the present disclosure, and are not used to limit the protection scope of the present disclosure. Any modification, equivalent replacement, improvement, etc. made within the spirit and principle of the present disclosure shall be included in the protection scope of the present disclosure.

What is claimed is:

1. A method for processing a session, applied to a terminal device and comprising:
    determining a processing manner of a second protocol data unit (PDU) session based on a priority of a first PDU session and a number of PDU sessions,
    wherein the second PDU session is an activated PDU session including an activated user plane resource; and
    wherein determining a processing manner of a second protocol data unit (PDU) session based on a priority of a first PDU session and a number of PDU sessions comprises determining the processing manner of the second PDU session based on a comparison result between a number of activated PDU sessions and a number threshold.

2. The method according to claim 1, wherein determining a processing manner of a second protocol data unit (PDU) session based on a priority of a first PDU session and a number of PDU sessions comprises:
    obtaining a session message from a higher layer, wherein the session message is used for indicating establishment or activation of the first PDU session; and
    in response to the session message, determining the processing manner of the second PDU session based on the priority of the first PDU session and the number of the PDU sessions.

3. The method according to claim 1, wherein determining a processing manner of a second PDU session based on a priority of a first PDU session and a number of PDU sessions comprises:
    determining the processing manner of the second PDU session based on the priority of the first PDU session when the number of activated sessions is equal to the number threshold; or
    determining the processing manner of the second PDU session without being based on the priority of the first PDU session when the number of activated sessions is less than the number threshold.

4. The method according to claim 1, wherein the activated PDU sessions have activated user plane resources, and the user plane resources comprise data radio bearer DRBs, the determining a processing manner of a second PDU session based on a priority of a first PDU session and a number of PDU sessions comprises:
    determining the processing manner of the second PDU session based on the priority of the first PDU session when the number of DRBs is equal to the number threshold; or
    determining the processing manner of the second PDU session without being based on the priority of the first PDU session when the number of DRBs is less than the number threshold.

5. The method according to claim 3, wherein the number threshold is 2.

6. The method according to claim 1, wherein the determining a processing manner of a second PDU session based on a priority of a first PDU session and a number of PDU sessions comprises:
    determining not to deactivate the second PDU session, or determining not to release the second PDU session when the priority of the first PDU session does not meet the priority requirement.

7. A terminal device, comprising: a processor and a memory, wherein the memory is configured to store a computer program, the processor is configured to call and run the computer program stored in the memory to execute the following:
    determining a processing manner of a second protocol data unit (PDU) session based on a priority of a first PDU session and a number of PDU sessions,
    wherein the second PDU session is an activated PDU session including an activated user plane resource; and
    wherein determining a processing manner of a second protocol data unit (PDU) session based on a priority of a first PDU session and a number of PDU sessions comprises determining the processing manner of the second PDU session based on a comparison result between a number of activated PDU sessions and a number threshold.

8. The terminal device according to claim 7, wherein the processor is further configured to:
    obtain a session message from a higher layer, wherein the session message is used for indicating establishment or activation of the first PDU session; and
    in response to the session message, determine the processing manner of the second PDU session based on the priority of the first PDU session and the number of PDU sessions.

9. The terminal device according to claim 7, wherein the processor is further configured to:
    determine the processing manner of the second PDU session based on the priority of the first PDU session when the number of activated sessions is equal to the number threshold; or
    determine the processing manner of the second PDU session without being based on the priority of the first PDU session when the number of activated sessions is less than the number threshold.

10. The terminal device according to claim 7, wherein the activated PDU sessions have activated user plane resources, and the user plane resources comprise data radio bearer DRBs, and the processor is further configured to:
    determine the processing manner of the second PDU session based on the priority of the first PDU session when the number of DRBs is equal to the number threshold; or
    determine the processing manner of the second PDU session without being based on the priority of the first PDU session when the number of DRBs is less than the number threshold.

11. The terminal device according to claim 10, wherein the number threshold is 2.

12. The terminal device according to claim 7, wherein the processor is further configured to:
    determine not to deactivate or release the second PDU session when the priority of the first PDU session does not meet the priority requirement.

13. A non-transitory computer-readable storage medium for storing a computer program that causes a computer to execute the followings:

determining a processing manner of a second protocol data unit (PDU) session based on a priority of a first PDU session and a number of PDU sessions, wherein the second PDU session is an activated PDU session including an activated user plane resource; and wherein determining a processing manner of a second protocol data unit (PDU) session based on a priority of a first PDU session and a number of PDU sessions comprises determining the processing manner of the second PDU session based on a comparison result between a number of activated PDU sessions and a number threshold.

14. The non-transitory computer-readable storage medium according to claim 13, wherein determining a processing manner of a second protocol data unit (PDU) session based on a priority of a first PDU session and a number of PDU sessions comprises:

obtaining a session message from a higher layer, wherein the session message is used for indicating establishment or activation of the first PDU session; and in response to the session message, determining the processing manner of the second PDU session based on the priority of the first PDU session and the number of the PDU sessions.

15. The non-transitory computer-readable storage medium according to claim 13, wherein determining a processing manner of a second protocol data unit (PDU) session based on a priority of a first PDU session and a number of PDU sessions comprises:

determining the processing manner of the second PDU session based on the priority of the first PDU session when the number of activated sessions is equal to the number threshold; or determining the processing manner of the second PDU session without being based on the priority of the first PDU session when the number of activated sessions is less than the number threshold.

16. The non-transitory computer-readable storage medium according to claim 13, wherein the activated PDU sessions have activated user plane resources, and the user plane resources comprise data radio bearer DRBs, the determining a processing manner of a second PDU session based on a priority of a first PDU session and a number of PDU sessions comprises:

determining the processing manner of the second PDU session based on the priority of the first PDU session when the number of DRBs is equal to the number threshold; or determining the processing manner of the second PDU session without being based on the priority of the first PDU session when the number of DRBs is less than the number threshold.

17. The non-transitory computer-readable storage medium according to claim 16, wherein the number threshold is 2.

18. The non-transitory computer-readable storage medium according to claim 13, wherein the determining a processing manner of a second PDU session based on a priority of a first PDU session and a number of PDU sessions comprises:

determining not to deactivate the second PDU session, or determining not to release the second PDU session when the priority of the first PDU session does not meet the priority requirement.

19. The method according to claim 6, wherein the priority of the first PDU session is a normal service level which is lower than a security alert level, and the priority requirement is that a priority of a newly established session or a newly activated session needs to reach the security alert level.

20. The terminal device according to claim 12, wherein the priority of the first PDU session is a normal service level which is lower than a security alert level, and the priority requirement is that a priority of a newly established session or a newly activated session needs to reach the security alert level.

* * * * *